United States Patent
Biemond et al.

(10) Patent No.: US 9,738,015 B2
(45) Date of Patent: Aug. 22, 2017

(54) PROCESS FOR THE PREPARATION OF A REINFORCED ARTICLE

(71) Applicants: SABIC GLOBAL TECHNOLOGIES B.V., Bergen Op Zoom (NL); Gerard Jan Eduard Biemond, Geleen (NL); Carmela Tufano, Geleen (NL)

(72) Inventors: Gerard Jan Eduard Biemond, Brunssum (NL); Carmela Tufano, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 14/916,824

(22) PCT Filed: Aug. 29, 2014

(86) PCT No.: PCT/EP2014/068385
§ 371 (c)(1),
(2) Date: Mar. 4, 2016

(87) PCT Pub. No.: WO2015/032699
PCT Pub. Date: Mar. 12, 2015

(65) Prior Publication Data
US 2016/0193760 A1    Jul. 7, 2016

(30) Foreign Application Priority Data

Sep. 5, 2013  (EP) .................................... 13183139

(51) Int. Cl.
| | | |
|---|---|---|
| B29C 45/00 | (2006.01) | |
| B29C 45/72 | (2006.01) | |
| C08J 5/04 | (2006.01) | |
| C08K 3/36 | (2006.01) | |
| B29B 9/06 | (2006.01) | |
| B29B 9/14 | (2006.01) | |
| B29K 509/08 | (2006.01) | |
| B29B 15/12 | (2006.01) | |
| B29K 23/00 | (2006.01) | |
| B29K 309/08 | (2006.01) | |
| B29K 105/12 | (2006.01) | |
| B29K 105/16 | (2006.01) | |

(52) U.S. Cl.
CPC ............ B29C 45/0005 (2013.01); B29B 9/06 (2013.01); B29B 9/14 (2013.01); B29C 45/0013 (2013.01); B29C 45/72 (2013.01); C08J 5/043 (2013.01); C08K 3/36 (2013.01); *B29B 15/12* (2013.01); *B29C 2045/0091* (2013.01); *B29K 2023/12* (2013.01); *B29K 2105/12* (2013.01); *B29K 2105/16* (2013.01); *B29K 2309/08* (2013.01); *B29K 2509/08* (2013.01); *B29K 2509/14* (2013.01); *C08J 2323/12* (2013.01)

(58) Field of Classification Search
CPC . B29C 45/0005; B29C 45/0013; B29C 45/72; B29C 2045/0091; B29C 2309/08
See application file for complete search history.

(56) References Cited

U.S. PATENT DOCUMENTS

| | | | |
|---|---|---|---|
| 4,338,233 A | 7/1982 | Das et al. | |
| 6,291,064 B1 * | 9/2001 | Kadowaki | ................ B29B 9/06 428/221 |

FOREIGN PATENT DOCUMENTS

| | | |
|---|---|---|
| EP | 0206189 A1 | 12/1986 |
| EP | 1460166 A1 | 9/2004 |
| WO | 2009080281 A1 | 7/2009 |

OTHER PUBLICATIONS

International Search Report for International Application No. PCT/EP2014/068385; International Filing Date: Aug. 29, 2014; Date of Mailing: Dec. 4, 2014; 4 Pages.
Written Opinion of the International Searching Authority for International Application No. PCT/EP2014/068385; International Filing Date: Aug. 29, 2014; Date of Mailing: Dec. 4, 2014; 4 Pages.

* cited by examiner

*Primary Examiner* — Robert Harlan
(74) *Attorney, Agent, or Firm* — Cantor Colburn LLP

(57) ABSTRACT

The invention is directed to a process for the preparation of a reinforced article which comprises the step of molding a molding composition comprising pellets into the article at an elevated temperature, wherein each of the pellets has an axial length and comprises a core and a sheath around the core, wherein the core comprises an impregnating agent and a multifilament strand comprising glass fibers each having a length substantially equal to the axial length of the pellet and substantially oriented in the axial length of the pellet, wherein the sheath comprises a thermoplastic polymer; and wherein the molding composition further comprises a filler.

13 Claims, No Drawings

PROCESS FOR THE PREPARATION OF A REINFORCED ARTICLE

CROSS REFERENCE TO RELATED APPLICATIONS

This application is a 371 of International Application No. PCT/EP2014/068385, filed Aug. 29, 2014, which claims priority to European Application No. 13183139, filed Sep. 5, 2013, both of which are incorporated herein by reference in their entirety.

The invention relates to a process for the preparation of a reinforced article.

Introduced more than half a century ago, fiber-reinforced plastics are composite materials with a wide range of applications in industry, for example in the aerospace, automotive, chipping, building and construction industries. A reinforced article can comprise any combination of individual materials, for example a thermoplastic polymer (the matrix) in which fibers (reinforcing fiber) have been dispersed. A great diversity of organic fibers, including synthetic fibers such as polyamide, polytetrafluoroethylene, polyesters, natural fibers such as cotton, hemp, flax, jute and inorganic fibers, such as glass fibers and carbon fibers are often used as reinforcing fibers in composite materials.

The reinforced plastics industry has been using glass fibers in different forms for reinforcing polymer matrices to produce a diversity of products. Glass fibers are generally supplied as a plurality of continuous, very long filaments, and can be in the form of strands, rovings or yarns. A filament is an individual fiber of reinforcing material. A strand is a plurality of bundled filaments. Yarns are collections of filaments or strands twisted together. A roving refers to a collection of strands wound into a package.

A process for producing reinforced compositions is for example described in WO2009/080281. In this publication a process is described for producing a long glass fiber-reinforced thermoplastic polymer composition, which comprises the subsequent steps of:

a. Unwinding from a package of at least one continuous glass multifilament strand containing a sizing composition;

b. Applying an impregnating agent to said at least one continuous glass multifilament strand to form an impregnated continuous multifilament strand;

c. Applying a sheath of thermoplastic polymer around the impregnated continuous multifilament strand to form a sheathed continuous multifilament strand; and d. Cutting the sheathed continuous glass multifilament strand into pellets.

The pellets that are obtained with the above-described process comprise a multifilament glass strand that has the same length as the pellet. When these pellets are molded into an article the stiffness of the article is not sufficient in all cases. The stiffness of an article can be raised by raising the amount of glass fibers in the article. However, pellets which contain a higher amount than 50 wt % of glass fibers cannot be used in injection molding processes. Moreover with increasing glass fibre content the weight of the final part will increase which is not always desirable in particular not in the automotive industry.

The manufacture of fiber reinforced thermoplastic moulded product is known for example from U.S. Pat. No. 6,291,064. This patent discloses a fibre reinforced thermoplastic resin pellet comprising a thermoplastic resin as a matrix polymer and glass fibres as the reinforcing fibres, wherein the length of the pellet is about 2 to 12 mm, the glass fibres having substantially the same length as the pellet are contained in an amount of 20 to 60 vol % of the total pellet, in the state of aligned or twisted fibres along the longitudinal direction of the pellet, and $L/D^2$ is 0.45 or more and L/D is from 1.1 to 6 wherein L represents the length of the pellet and D represents the diameter thereof. The pellet disclosed in this US patent is blended with a resin pellet which does not substantially contain any glass fibre, and then the blend can be injection moulded to produce the moulded product.

It is an object of the invention to provide a process for the preparation of a reinforced article with an increased stiffness.

This object is achieved by the provision of a process according to the appended claims.

That is, this object is met with a process for the preparation of a reinforced article which comprises the step of molding a molding composition comprising pellets into the article at an elevated temperature, wherein each of the pellets has an axial length and comprises a core extending along the axial length and a sheath around the core, wherein the core comprises an impregnating agent and a multifilament strand comprising glass fibers each having a length substantially equal to the axial length of the pellet and substantially oriented in the axial length of the pellet, wherein the sheath comprises a thermoplastic polymer, wherein the thermoplastic polymer is a propylene homopolymer or a propylene copolymer; and wherein the molding composition further comprises a filler and wherein the molded composition has an isotropic E-modulus of at least 5000 MPa as determined according to ISO527/1B at 23° C.

Preferably, the isotropic E-modulus is at least 5500 MPa, more preferably at least 5600 MPa, for example at least 5800 or at least 6000 MPa. This is surprisingly much higher than the isotropic E-modulus that is expected when preparing an article from a glass fiber reinforced molding composition which does not contain a filler.

For the avoidance of doubt it should be understood that the filler is a reinforcing filler, i.e. a filler that increases the stiffness (modulus) of a thermoplastic material. Non-reinforcing fillers are not to be regarded as "fillers" in the context of the present invention. A filler is considered non-reinforcing if the increase in isotropic modulus (if any) of a composition containing 10 wt % of such filler is at most 2%, when compared to the same composition with no such fillers.

By using the process of the invention, one or more of the following additional advantages may also be achieved:

1) The flowability of the melted molding composition according to the invention will be improved. Because of the improved flowability the design of articles can contain smaller details (e.g. ribs) that will be filled with material during molding. This also allows the design of thinner articles.

2) The shrinkage and warpage of the article prepared from the molding composition according to the invention will be lower than for an article prepared from a molding composition comprising only the glass fibers.

The pellet used in the present invention has a generally cylindrical shape having an axial length, i.e. the length in the direction perpendicular to the cross section of the cylinder. The core of the pellet has a generally cylindrical shape and comprises a multifilament strand made of glass fibers impregnated with an impregnating agent. The glass fibers have a length substantially equal to the axial length of the pellet. The core of the pellet is surrounded around its circumference by a sheath having a generally tubular shape comprising a thermoplastic polymer.

For the avoidance of doubt it should be understood that the pellet has a core sheath structure wherein the core comprises the impregnating agent and the glass multifilament strand. The sheath consists of the thermoplastic material (optionally including the filler) and surrounds the core. The core does not contain the material of the sheath. Such pellet structure is obtainable by a wire-coating process such as for example disclosed in WO 2009/080281 and is distinct from the pellet structure that is obtained via the typical pultrusion type of processes such as disclosed in U.S. Pat. No. 6,291,064.

The molding composition can be provided by mixing the pellets and the filler as separate components. In this case, the pellets may be the pellets as described in WO2009/080281. Alternatively, the molding composition can be provided by providing pellets comprising the filler as part of the pellets.

Accordingly, in some embodiments of the process of the invention, the molding step involves the steps of: mixing the pellets and the filler as separate components to provide the molding composition and heating the molding composition to the elevated temperature. In this case, the filler can be added as such to the molding composition or the filler can be added in the form of a masterbatch comprising a polymer and a filler. This masterbatch of the filler can contain various types and amounts of filler and polymers. Mixtures of several fillers and/or polymers can be present in the masterbatch. The masterbatch can be provided to the process in the form of pellets. The polymer used in the masterbatch may be a polypropylene, like a propylene homopolymer, a random copolymer, or a so-called heterophasic copolymer of propylene and ethylene and/or another alpha-olefin. Most preferably, the thermoplastic polymer is polypropylene homo- or copolymer. The thermoplastic polymer as in the sheath of the pellets and the polymer in the masterbatch are preferably of the same type.

Mixing of the pellets and the filler can be performed in commonly used mixing devices to provide a molding composition wherein the pellet and the filler are homogeneously divided. Commonly used mixing devices are blenders, for example V blender, ribbon blender or a cone blender; mixers, for example a jet mixer, a planetary mixer or a Banbury mixer; or extruders. The molding composition can be heated before, during and/or after mixing of the molding composition. The polymers in the molding composition melt and form a matrix which is to be reinforced by the glass fibers.

Molding is performed at an elevated temperature, which is a temperature at which the molding composition has enough flowability to be molded (i.e. the polymers in the composition are melted). The elevated temperature is above the melting point of the thermoplastic polymer that is present in the sheath of the pellets. In the cases where a masterbatch comprising the filler and a polymer is used, the elevated temperature is also above the melting temperature of the polymer present in the masterbatch. The elevated temperature may be suitably chosen by the skilled person. Generally, the elevated temperature may e.g. be 150-500° C., 180-400° C. or 200-300° C. In the cases where the thermoplastic polymer in the pellet is a propylene homo- or co-polymer, the elevated temperature is preferably 200-300° C.

In some embodiments of the invention, the filler is provided as a part of the pellets. Accordingly, in some embodiments of the process of the invention, the molding step involves the step of providing the molding composition comprising the pellets comprising the filler and heating the molding composition to the elevated temperature. This has the advantage that only the pellets need to be fed to the process for the preparation of a reinforced article. Preferably, the filler is present in the sheath of the pellet.

Suitable examples of molding processes include injection molding, compression molding, extrusion and extrusion compression molding. Injection molding is widely used to produce articles such as automotive exterior parts like bumpers, automotive interior parts like instrument panels, or automotive parts under the bonnet. Extrusion is widely used to produce articles such rods, sheets and pipes. Preferably, the molding involves injection molding in the process according to the invention.

With the process according to the invention reinforced articles are made. Preferably the article is an automotive part.

Glass multifilament strands and their preparation are known in the art. The glass fibers in the strand may have been formed by any method known to those skilled in the art. Particularly, the glass fibers may have been formed by a melt spinning process. The length of the glass fibers in the strand is determined by the length of the pellet and may vary in a wide range. For example the average length may vary between 10 to 50 mm, preferably between 10-25 mm, more preferably between 10-20 mm.

The fiber density of the fibers in the strand may vary within wide limits. Preferably, the strand may have from 500 to 10000 glass fibers/strand and more preferably from 2000 to 5000 glass fibers/strand. The diameter of the glass fibers in the strand may widely vary. Preferably, the diameter of the glass fibers in the strand ranges from 5 to 50 microns, more preferably from 10 to 30 microns and most preferably from 15 to 25 microns. Glass fiber diameters outside these ranges tend to result in a decrease of mechanical properties and/or enhanced abrasion of the equipment used.

The amount of the glass fibers in the multifilament strand in the pellet is preferably 5-70 wt % of based on the total weight of the molding composition. The amount of the glass fibers in the multifilament strand in the pellet is preferably at least 5 wt %, preferably at least 10 wt %, more preferably at least 20 wt %. The amount of the glass in the multifilament strand in the pellet is preferably at most 70 wt %, preferably at most 60 wt % and more preferably at most 50 wt %. Preferably the amount of glass fibers (in the multifilament strand is from 30-50 wt % based on the weight of the molding composition and the amount of filler is from 1-20 wt % or 5-20 wt % based on the weight of the molding composition.

The multifilament strand may comprise a sizing composition. Suitable examples of conventional sizing compositions include solvent-based compositions, such as an organic material dissolved in aqueous solutions or dispersed in water and melt- or radiation cure-based compositions. More particularly, an aqueous sizing composition is applied on the individual glass fibers, but also oil-based sizing compositions can be applied.

As already described in the art, e.g. in documents EP1460166A1, EP0206189A1 or U.S. Pat. No. 4,338,233, an aqueous sizing composition typically includes film formers, coupling agents and other additional components. The film formers are generally present in effective amount to protect fibers from inter-filament abrasion and to provide integrity and processability for fiber strands after they are dried. Suitable examples of film formers generally include polyurethanes, polyesters, such as polycaprolactone, polyolefins, such as polypropylene, polyamides. It is already recognized in the art that the film former should be miscible with the polymer to be reinforced. For example, polycaprolactone may be used as film former when nylon is used as polymer to be reinforced; for reinforcing polypropylenes, suitable film formers generally comprise polyolefin waxes.

The coupling agents are generally used to improve the adhesion between the matrix thermoplastic polymer and the fiber reinforcements. Suitable examples of coupling agents known in the art as being used for the glass fibers include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. In a preferred embodiment of the process of the invention, glass fibers having a sizing composition containing an aminosilane are applied as multifilament strands, to result in good adhesion to the matrix formed by the melted thermoplastic polymer of the sheath. Any other additional components known to the skilled person may be present in the sizing composition. Suitable examples include lubricants, used to prevent damage to the strands by abrasion, antistatic agents, crosslinking agents, plasticizers, surfactants, nucleation agents, antioxidants, pigments and any combinations thereof. Applying a sizing composition to the formed glass filaments is well-known in the art. Typically, after applying the sizing composition on the glass fibers, the fibers are bundled into strands and then wound on bobbins to form a package. A multifilament strand which contains at most 2 wt % of a sizing composition based on the total weight of the glass fibers in the multifilament strand is preferably employed in the pellets used in the process of the invention. The amount of the sizing composition can be determined by loss on ignition (LOI). The LOI is a well-known technique for determining the amount of sizing on glass fibers. More preferably, a multifilament strand containing from 0.1 to 1 wt % of sizing composition, as determined by loss on ignition (LOI) is used.

Preferably, strand(s) comprising glass fibers on which a sizing composition has been applied as aqueous dispersion are employed in the pellet according to the invention.

In the process according to the invention, a pellet comprising an impregnating agent in the core is used.

The impregnating agent used in the process according to the present invention comprises at least one compound that is compatible with the thermoplastic polymer. The impregnating agent enables the enhanced dispersion of the fibers in the thermoplastic polymer matrix during the molding process.

The viscosity of the impregnating agent preferably is lower than 100 cS, more preferably lower than 75 cS and most preferably lower than 25 cS at application temperature. The viscosity of the impregnating agent preferably is higher than 2.5 cS, more preferably higher than 5 cS, and most preferably higher than 7 cS at the application temperature. An impregnating agent having a viscosity higher than 100 cS is difficult to apply to the multifilament strand comprising glass fibers. Low viscosity is needed to facilitate good wetting performance of the fibers, but an impregnating agent having a viscosity lower than 2.5 cS is difficult to handle, e.g., the amount to be applied is difficult to control; and the impregnating agent could become volatile. Without wishing to be bound to any theory, the inventors believe that the impregnation of the multifilament strands, without separating or spreading of individual filaments, by the impregnating agent is driven mainly by capillary forces.

The application temperature is chosen such that the desired viscosity range is obtained. For example, when the matrix is polypropylene, the application temperature of the impregnating agent can be from 15 to 200° C.

The amount of impregnating agent applied to the multifilament strand comprising glass fibers depends on the thermoplastic matrix, on the size (diameter) of the fibers forming the strand, and on type of sizing that is on the surface of the fibers. The pellet according to the invention may comprise 1-10 wt % impregnating agent based on the weight of the glass fibers in the multifilament strand in the pellet. The amount of impregnating agent in the pellet may be at least 1 wt %, preferably at least 2 wt %, more preferably at least 3 wt % based on the weight of the glass fibers in the multifilament strand in the pellet. The amount of impregnating agent in the pellet may be at most 10 wt %, preferably at most 9 wt % and more preferably at most 8 wt % based on the weight of the glass fibers in the multifilament strand in the pellet. The impregnating agent assists homogeneous dispersion of glass fibers in the thermoplastic polymer matrix during molding, but the amount should not be too high, because an excess of the amount of impregnating agent may result in decrease of mechanical properties of the articles. It is found that the lower the viscosity, the less impregnating agent can be applied. For instance, in case the thermoplastic matrix is polypropylene homopolymer with a melt index MFI of 25 to 65 g/10 min (230 degrees C./2.16 kg) and the reinforcing glass filaments have a diameter of 19 micron, the impregnating agent is preferably applied to the multifilament strand in an amount of from 2 to 10 wt %.

The amount of the impregnating agent is preferably 0.05-6 wt % based on the total weight of the molding composition.

The impregnating agent should be compatible with the thermoplastic polymer to be reinforced, and may even be soluble in said polymer. The skilled man can select suitable combinations based on general knowledge, and may also find such combinations in the art. Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as branched polyethylenes and polypropylenes, polyamides, such as nylons, and other hydrocarbon resins. As a general rule, a polar thermoplastic polymer matrix requires the use of an impregnating agent containing polar functional groups; a non-polar polymer matrix involves using an impregnating agent having non-polar character, respectively. For example, for reinforcing a polyamide or polyester, the impregnating agent may comprise low molecular weight polyurethanes or polyesters, like a polycaprolactone. For reinforcing polypropylenes, the impregnating agent may comprise branched poly(alpha-olefins), such as polyethylene waxes, modified low molecular weight polypropylenes, mineral oils, such as, paraffin or silicon and any mixtures of these compounds. Preferably, the impregnating agent comprises a branched poly(alpha-olefin) and, more preferably, the impregnating agent is a branched polyethylene wax. In the cases the thermoplastic polymer is polypropylene the wax is optionally mixed with for example from 10 to 80, preferably 20-70 wt % of a hydrocarbon oil or wax, like a paraffin oil, to reach the desired viscosity level.

The impregnating agent is non-volatile, and substantially solvent-free. Being non-volatile means that the impregnating agent does not evaporate under the application and processing conditions applied; that is it has a boiling point or range higher than said processing temperatures. In the context of present application, "substantially solvent-free" means that impregnating agent contains less than 10 percent by mass of solvent, preferably less than 5 percent by mass solvent. Most preferably, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range.

In the process according to the invention a filler is used. The filler preferably is a particulate filler, which may be of any configuration, for example spheres, plates, fibers, acicular, flakes, whiskers, or irregular shapes. Suitable fillers typically have an average longest dimension of about 1 nanometer to about 500 micrometers, specifically about 10 nanometers to about 100 micrometers. The average aspect ratio (length:diameter) of some fibrous, acicular, or whisker-shaped fillers (e.g., glass or wollastonite) may be about 1.5 to about 1000, although longer fibers are also within the scope of the invention. The mean aspect ratio (mean diameter of a circle of the same area:mean thickness) of plate-like fillers (e.g., mica, talc, or kaolin) may be greater than about 5, specifically about 10 to about 1000, more specifically about 10 to about 200. Bimodal, trimodal, or higher mixtures of aspect ratios may also be used.

The filler with a sphere, plate, acicular, flake or irregular shape preferably has a particle size of 0.01 to 10 μm, more preferably of 0.1 to 8 μm, most preferably of 0.1 to 5 μm. The particle size is expressed as the D50 of the particles. This means that 50 weight % of the particles has a size that falls within the above-mentioned ranges.

For fillers with a fiber or whisker shape the fiber diameter is preferably between 1 and 20 μm, more preferably between 5 and 15 μm. The length of the fibers, before molding, is preferably between 1 and 10 mm, more preferably between 2 and 8 mm.

The fillers may be of natural or synthetic, mineral or non-mineral origin, provided that the fillers have sufficient thermal resistance to maintain their solid physical structure at least during the molding process. Suitable fillers may include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, Iib, IIa, IIIb, IVa, IVb (except carbon), Va, Via, ViIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are preferred. More preferably, the filler is selected from talc or glass fibers (other than the fibers in the core of the pellets).

Optionally, the fillers may be surface modified, for example treated so as to improve the compatibility of the filler and the thermoplastic polymer which facilitates de-agglomeration and the uniform distribution of fillers into the polymers. Surface modification of fillers is known to the skilled person.

Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. Talc suitable for use as filler is commercially available from for example Imerys or Luzenac. Talc is available in different colours, such as green, blue, black and white. Depending on the application, talc with a specific colour may be used. For many applications however, it is desired to use a white talc.

As used in the process of the invention, 'talc' refers to both natural and synthetic talc. Talc is available in several particle sizes, for example the particle sizes of talc are classified as 'ultrafine' (average particle size of lower than 1 μm, for example an average particle size in the range of 0.3 to 0.9 μm) and 'fine' (average particle size of at least 1 μm, for example an average particle size of 1 μm to 5 μm). Preferably, fine or ultrafine powder particles are used in the process of the present invention.

In the process according to the invention the molding composition preferably comprises 1-25 wt % of the filler based on the total weight of the molding composition. The amount of the filler is at least 1 wt %, preferably at least 2 wt %, more preferably at least 4 wt %. The amount of filler is at most 25 wt %, preferably at most 22 wt % and more preferably at most 20 wt %.

In the process according to the invention pellets are used comprising a sheath comprising a thermoplastic polymer.

The thermoplastic polymer in the sheath of the pellets is a polypropylene homo- or copolymer. The thermoplastic polymer may be a single grade of polypropylene but may also be a mixture of at least two different polypropylene grades.

The sheath may further contain one or more common additives, for example stabilisers, processing aids, impact-modifiers, flame-retardants, acid scavengers, inorganic fillers, colorants, or components that further enhance properties of the fiber reinforced article, like compounds that enhance interfacial bonding between polymer and glass filaments. It is preferred that the molding composition, in particular the thermoplastic of the sheath comprises one or more of a functionalized polyolefin, like a maleated polypropylene. The amount of the functionalized polyolefin that is added is dependent on the reinforced article and is normally 0.1 to 2 wt % with respect to the weight of the glass fibers in the multifilament strand, preferably 0.2 to 1.5 wt %.

The amount of the thermoplastic polymer in the sheath of the pellets is preferably 15-94.5 wt %, more preferably 20-90 wt %, more preferably 25-80 wt %, more preferably 30-70 wt %, based on the total of the molding composition.

In the cases where the molding composition comprises a masterbatch comprising the filler and the polymer, the sum of the amount of the polymer in the sheath of the pellets and the polymer in the masterbatch is 15-94.5 wt %, more preferably 20-90 wt %, more preferably 25-80 wt %, more preferably 30-70 wt %, based on the total of the molding composition.

The invention is also directed to a molding composition comprising pellets, wherein each of the pellets has an axial length and comprises a core extending along the axial length and a sheath around the core,
wherein the core comprises an impregnating agent and a multifilament strand comprising fibers each having a length substantially equal to the axial length of the pellet and substantially oriented in the axial length of the pellet,
wherein the sheath comprises a thermoplastic polymer; and wherein the molding composition further comprises a filler.

Preferably, the molding composition comprises 5-70 wt % of the glass fibers in the multifilament strand and 0.5-25 wt % of the filler. More preferably, the molding composition comprises 20-60 wt % of the glass fibers in the multifilament strand and 0.5-25 wt % of the filler. Preferably, the sum of the glass fibers in the multifilament strand, the filler and the polymer (the thermoplastic polymer in the pellets and the polymer in any masterbatch) is at least 90 wt %, at least 95 wt % or at least 98 wt % of the total of the molding composition.

The molding composition can comprise the pellets and the filler as separate components. Alternatively, the molding composition can comprise the filler as part of the pellets. Preferably, the filler is present in the sheath of the pellet.

Further the invention is directed to a pellet having an axial length and comprising a core extending along the axial length and a sheath around the core,
wherein the core comprises an impregnating agent and a multifilament strand comprising glass fibers each having a length substantially equal to the axial length of the pellet and substantially oriented in the axial length of the pellet,
wherein the sheath comprises a thermoplastic polymer and a filler.

Preferably, the pellet comprises 5-70 wt % of the glass fibers in the multifilament strand and 0.5-25 wt % of the filler. More preferably, the pellet comprises 20-60 wt % of the glass fibers in the multifilament strand and 0.5-25 wt % of the filler. Preferably, the sum of the glass fibers in the multifilament strand, the filler and the thermoplastic polymer in the pellets is at least 90 wt %, at least 95 wt % or at least 98 wt % of the total of the molding composition.

The diameter of the multifilament strand in the pellet may e.g. be between 60 and 70 mm when the core of the pellet comprises one strand and between 90 and 100 mm when the core of the pellet comprises 2 strands.

The thickness of the sheath of the pellet preferably is at least 0.1 mm, more preferably at least 0.2 mm, most preferably at least 0.3 mm. The thickness of the sheath of thermoplastic polymer is preferably at most 1 mm, more preferably at most 0.5 mm, most preferably at most 0.45 mm. The thickness of the sheath is determined largely by the dimension of the glass multifilament strand and the desired amount of glass fibres in the final molding composition.

The length of the pellet preferably is between 10 to 50 mm, more preferably between 10-25 mm, most preferably between 10-20 mm.

The pellet according to the invention can be prepared by a process which comprises the steps of:
a. applying an impregnating agent to at least one multifilament strand comprising glass fibers to form an impregnated multifilament strand and
b. applying a sheath comprising a thermoplastic polymer and a filler around the impregnated multifilament strand to form a sheathed multifilament strand.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is also to be understood that a description on a product comprising certain components also discloses a product consisting of these components. Similarly, it is also to be understood that a description on a process comprising certain steps also discloses a process consisting of these steps.

The invention will now be elucidated by way of the following examples without however being limited thereto.

EXAMPLES

Testing Methods

Injection molding of samples for measuring isotropic strength and isotropic modulus was done on an Arburg 320T using a mould with dimensions of 270×310×3 mm. The injection molding machine has 8 temperature zones (220, 220, 230, 230, 235, 235, 240, 240° C.). Injection pressure is 800 bar and backpressure is 150 bar.

Specimen types as defined by ISO 527/1B were machined from plates obtained or cut by water jet, taking care to obtain smooth specimen edges.

Tensile testing was carried out according to ISO 527/1B at 23° C.

Test speed for determining E-modulus was 1 mm/min and tensile strength and elongation at break was determined at a test speed of 5 mm/min.

At least 6 specimens per orientation (0°, 45° and 90°) were tested.

Example 1

A molding composition was prepared by mixing pellets comprising glass fibers and a masterbatch comprising talc.

The molding composition was injection molded into test samples. Isotropic E-modulus, tensile strength and elongation at break were determined. Results are summarized in Table I.

Pellets Comprising Glass Fibers

Pellets (glass filled pellets) were provided, comprising a core which comprises a multifilament strand, comprising glass fibers and an impregnating agent, and a sheath comprising a thermoplastic polymer. The pellets had a length of 15 mm.

The multifilament strand comprising glass fibers was obtained from PPG Fiber Glass; LFT9000 (fiber diameter 19 µm, 4000 fibers/strand); amino silane sizing.

The impregnating agent used was a blend of 40 wt % Vybar 260 supplied by Baker Hughes with 30 wt % of Microsere® 5981A and 30 wt % of Microsere® 5788A supplied by IGI.

The thermoplastic polymer in the sheath was SABIC® PP579S propylene homopolymer with a MFI of 45 g/10 min (230° C./2.16 kg).

Masterbatch Comprising Filler

Pellets of a masterbatch comprising 70 wt % of a polymer and 30 wt % of an ultrafine talc filler were provided by using a ZE40/43D extruder; side feeder: house 4; vacuum in house 9. The compounding temperature was 210° C.

The polymer used to prepare the masterbatch was SABIC® PP579S propylene homopolymer with a MFI of 45 g/10 min (230° C./2.16 kg). The ultrafine talc was HTP ultra5c (d50=0.45 um) supplied by IMI Fabi.

The molding composition comprised comprising 64 wt % of polypropylene, 30 wt % of glass fibers and 1 wt % of talc. The remaining portion consisted of the impregnating agent and additives.

Examples 2-10

Example 1 was repeated with different compositions of pellets and masterbatches to obtain the compositions summarized in Table 1. Results are summarized in Table I.

Comparative Experiment A-C

Experiment A was performed as a comparative experiment for examples 1-3. The process described under Example 1 was repeated except that no masterbatch comprising the fillers was used. Experiment B was performed as a comparative experiment for examples 4-6. Experiment C was performed as a comparative experiment for examples 9 and 10. The compositions and the results are summarized in Table 1.

Example 11

A molding composition comprising 45 wt % of glass fibers and 5 wt % of talc was prepared from pellets comprising glass fibers and talc. The molding composition was injection molded into test samples. E-modulus, tensile strength and elongation at break were determined. Results are summarized in Table II.

Pellets Comprising Glass Fibers and Talc

Pellets comprising talc filler in the sheath of thermoplastic polymer were prepared according to the following method.

The glass fiber multifilament strand was obtained from PPG Fiber Glass. Type: LFT9000 (fiber diameter 19 µm, 3000 tex, 4000 fibers/strand); amino silane sizing. A blend similar to the blend disclosed in WO 2009/080281 being a blend of 30 mass % Vybar 260 (hyper-branched polymer, supplied by Baker Petro lite) and 70 mass % Paralux oil (paraffin, supplied by Chevron) was used as impregnating agent. The impregnating agent was melted and mixed at a temperature of 160° C. and applied to the continuous glass multifilament strands.

The sheathing step was performed in-line directly after the impregnating step, using a 75 mm twin screw extruder (manufactured by Berstorff, screw L/D ratio of 34), at a temperature of about 250° C., which fed a blend of the melted thermoplastic polymer and the ultrafine talc filler to an extruder-head wire-coating die having a die-hole of 2.8 mm. The line speed for impregnating and sheathing was 250 m/min.

The thermoplastic polymer was SABIC® PP579S propylene homopolymer with a MFI of 45 g/10 min (230° C./2.16 kg).

The ultrafine talc was HTP ultra5c (d50=0.45 um) supplied by IMI Fabi.

The sheathed strand was cut into pellets of 12 mm length that were molded into test samples. The results are summarized in Table II.

Examples 12-15

Example 11 was repeated with different compositions of pellets to obtain the compositions summarized in Table II. Results are summarized in Table II.

Example 16

Example 11 was repeated using pellets comprising short glass fibers instead of talc particles.

The short glass fiber was DS 2100-13P from 3B, fibre diameter 13 µm, fiber length 3-5 mm, amino silane sizing.

Example 17-18

Example 1 was repeated using a masterbatch comprising short glass fibers instead of talc particles.

The short glass fiber was DS 2100-13P from 3B, fibre diameter 13 µm, fiber length 3-5 mm, amino silane sizing.

TABLE I

Talc Filler in Masterbatch.

| Example or Experiment | LGF [wt %] | Talc [wt %] | Isotropic E-modulus [MPa] | Isotropic Tensile strength [MPa] | Isotropic Elongation at break [%] |
| --- | --- | --- | --- | --- | --- |
| A | 30 | 0 | 3938 | 67.2 | 2.6 |
| 1 | 30 | 1 | 4034 | 66.0 | 2.4 |
| 2 | 30 | 10 | 4656 | 58.4 | 2.3 |
| 3 | 30 | 20 | 5460 | 56.1 | 2.0 |
| B | 40 | 0 | 4854 | 69.1 | 2.2 |
| 4 | 40 | 1 | 5045 | 66.2 | 1.9 |
| 5 | 40 | 10 | 5575 | 59.7 | 1.6 |
| 6 | 40 | 20 | 6290 | 52.7 | 1.4 |
| 7 | 45 | 5 | 5574 | 60.9 | 1.8 |
| 8 | 45 | 15 | 6223 | 51.8 | 1.4 |
| C | 50 | 0 | 5769 | 67.0 | 1.7 |
| 9 | 50 | 1 | 5861 | 63.3 | 1.5 |
| 10 | 50 | 10 | 6284 | 53.7 | 1.4 |

* The Long Glass Fiber (LGF) is the amount of glass fiber originating from the glass filled pellets.

TABLE II

Talc Filler in Sheath.

| Example or Experiment | Talc size d50 (µm) | LGF [wt %] | Talc [wt %] | Isotropic E-modulus [MPa] | Isotropic Tensile strength [MPa] | Isotropic Elongation at break [%] |
| --- | --- | --- | --- | --- | --- | --- |
| 11 | 0.45 | 45 | 5 | 5900.4 | 60.9 | 1.6 |
| 12 | 0.45 | 40 | 10 | 5843.2 | 57.5 | 1.6 |
| 13 | 0.45 | 30 | 20 | 5885.1 | 53.3 | 1.7 |

TABLE II-continued

Talc Filler in Sheath.

| Example or Experiment | Talc size d50 (μm) | LGF [wt %] | Talc [wt %] | Isotropic E-modulus [MPa] | Isotropic Tensile strength [MPa] | Isotropic Elongation at break [%] |
|---|---|---|---|---|---|---|
| 14 | 8 | 40 | 10 | 5801.6 | 56.4 | 1.6 |
| 15 | 1.5 | 40 | 10 | 5869.5 | 57.0 | 1.6 |

TABLE III

Short Glass Filler in Masterbatch or Sheath.

| Example or Experiment | | LGF [wt %] | Short glass filler [wt %] | Isotropic E-modulus [MPa] | Isotropic Tensile strength [MPa] | Isotropic Elongation at break [%] |
|---|---|---|---|---|---|---|
| 16 | Filler in sheath | 30 | 20 | 6103.9 | 68.3 | 1.8 |
| 17 | Filler in masterbatch | 30 | 20 | 5822.9 | 62.7 | 1.6 |
| 18 | Filler in masterbatch | 40 | 13.3 | 6120.4 | 63.6 | 1.5 |

From the results it becomes clear that with both a talc filler and a short glass filler articles can be obtained wherein the material of the article has a high isotropic E-modulus. Favorable tensile strength and elongation break are also obtained.

It is further shown that both a preparation process with the filler in the sheath and a preparation process with the filler supplied as a masterbatch gives good results for obtaining a material with a high Isotropic E-modulus.

Higher isotropic E-modulus can be obtained with an increasing amount of the long glass fibers and the filler.

Use of short glass fibers as the filler was found to give a higher Isotropic E-modulus than use of talc particles.

The invention claimed is:

1. A process for the preparation of a reinforced article comprising:
    molding a molding composition comprising pellets into the article at an elevated temperature, wherein the elevated temperature is a temperature at which the molding composition has enough flowability to be molded,
    wherein each of the pellets has an axial length and comprises a core extending along the axial length and a sheath around the core,
    wherein the core comprises an impregnating agent and a multifilament strand comprising glass fibers each having a length substantially equal to the axial length of the pellet and substantially oriented in the axial length of the pellet, wherein the amount of glass fibers in the multifilament strand is 30-50 wt % based on the weight of the molding composition,
    wherein the sheath comprises a thermoplastic polymer, wherein the thermoplastic polymer is a propylene homopolymer or a propylene copolymer; and
    wherein the molding composition further comprises a filler and wherein the molded composition has an isotropic E-modulus of at least 5000 MPa as determined according to ISO527/1B at 23° C.

2. The process according to claim 1, wherein the filler is present in the sheath of the pellet.

3. The process according to claim 1, wherein the filler comprises talc particles or glass fibers.

4. The process according to claim 1, wherein the molding step involves injection molding.

5. The process according to claim 1, wherein the molding composition comprises 0.5-25 wt % of the filler based on the weight of the molding composition.

6. The process according to claim 1, wherein the amount of filler is 1-20 wt % based on the weight of the molding composition.

7. An article obtainable by the process according to claim 1.

8. The article of claim 7, wherein the article is an automotive part.

9. The process of claim 1, wherein the isotropic E-modulus is at least 6000 MPa as determined according to ISO527/1B at 23° C.

10. The process of claim 1, wherein the viscosity of the impregnating agent is less than 100 Centistokes.

11. The process of claim 1, wherein the impregnating agent is present in an amount of 0.05 to 6 weight percent based on the total weight of the molding composition.

12. The process of claim 1, wherein the elevated temperature is above the melting point of the thermoplastic polymer that is present in the sheath of the pellets.

13. The process of claim 1, wherein the elevated temperature is 150-500° C.

* * * * *

UNITED STATES PATENT AND TRADEMARK OFFICE
CERTIFICATE OF CORRECTION

PATENT NO. : 9,738,015 B2  
APPLICATION NO. : 14/916824  
DATED : August 22, 2017  
INVENTOR(S) : Gerard Jan Eduard Biemond and Carmela Tufano Page 1 of 1

It is certified that error appears in the above-identified patent and that said Letters Patent is hereby corrected as shown below:

On the Title Page

Please remove the following text from the list of Item (71) Applicants: "Gerard Jan Eduard Biemond, Geleen (NL); Carmela Tufano, Geleen (NL)"

Signed and Sealed this  
Fourteenth Day of August, 2018

Andrei Iancu  
*Director of the United States Patent and Trademark Office*